3,169,965
NEW 4-MERCAPTO-PYRAZOLO[3,4-d]-
PYRIMIDINES
Paul Schmidt, Therwil, and Kurt Eichenberger and Max
Wilhelm, Basel, Switzerland, assignors to Ciba Corporation, a corporation of Delaware
No Drawing. Filed May 5, 1961, Ser. No. 107,907
Claims priority, application Switzerland, May 11, 1960,
5,405/60
8 Claims. (Cl. 260—256.5)

The present invention relates to the manufacture of pyrazolo[3,4-d]pyrimidines of the formula

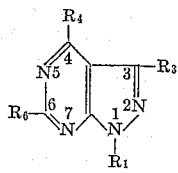

or of their tautomers, and, if desired, their quaternary ammonium compounds or their salts.

In the above formula $R_1$ represents an alkyl radical, a halogenalkyl or oxa-alkyl radical, a cycloalkyl-alkyl, cycloalkyl, aralkyl or heterocyclyl-alkyl radical, especially those in which the alkyl radicals are lower ones. Examples for such substituents are: methyl, ethyl, propyl, isopropyl, butyl, isobutyl, pentyl-(1), pentyl-(2), pentyl-(3), 2-methyl-butyl-(3) or hexyl radicals, 3-oxapentyl- or 5-oxa-heptyl-(2) radicals, halogen-lower alkyl radicals, such as chloroethyl groups, cyclopentyl or cyclohexyl radicals, cyclopentyl- or cyclohexyl-methyl, -ethyl or -propyl radicals, phenylalkyl, such as 1- or 2-phenyl-ethyl or phenylmethyl radicals in which the aromatic nuclei may bear substituents, such as lower alkyl groups or free or substituted hydroxy, amino or mercapto groups, halogen atoms, trifluoromethyl or nitro groups, or if desired, correspondingly substituted mononuclear heterocyclylalkyl radicals, such as pyridylmethyl, thenyl, or furfuryl radicals. The substituents in the aforementioned substituted hydroxy, mercapto or amino groups are more especially of the kind specified above, particularly lower alkyl radicals, these groups therefore being for example methoxy, ethoxy, propoxy, butoxy, corresponding alkylmercapto groups, alkylenedioxy, such as methylenedioxy groups, mono- or di-alkylamino groups, such as mono- or di-methylamino, -ethylamino, -propyl-amino, -butylamino or -pentylamino groups. Halogen atoms are more especially fluorine, chlorine or bromine.

$R_3$ stands for hydrogen, or in the second place for a lower alkyl radical, for example one of those mentioned for $R_1$, especially methyl.

$R_4$ is a free mercapto group or a mercapto group substituted by a lower alkyl or aminoalkyl radical. Lower alkyl radicals are more especially methyl, ethyl, straight or branched propyl, butyl, pentyl or hexyl radicals which may be bound in any position; as aminoalkyl radicals there come into consideration more especially those in which the alkyl radical separates the sulfur atom from the nitrogen atom by at least 2 carbon atoms and is one of those mentioned above, and in which the amino group is mono- or di-substituted by hydrocarbon radicals which may also be interrupted in the chain by oxygen, nitrogen or sulfur. $R_4$ is therefore, for example a mono- or di-lower alkylamino-ethyl, -propyl or -butyl-mercapto group, a pyrrolidino-ethyl, -propyl or -butyl-mercapto group, a piperidino-ethyl, -propyl or -butyl-mercapto group, a morpholino-ethyl, -propyl or -butyl-mercapto group, or a piperazino-ethyl, -propyl or -butyl-mercapto group.

$R_6$ is a lower alkyl radical, for example one of those mentioned above in connection with $R_4$, or a possibly substituted aralkyl or heterocyclylalkyl radical with the proviso that in a 1:6 -dialkyl compound at least one of the alkyl radicals in 1- and 6-position contains more than 2 carbon atoms. The alkyl radicals of the aralkyl or heterocyclyl-alkyl radicals are more especially, for example methyl, ethyl, propyl or butyl radicals. Besides being a lower alkyl radical, $R_6$ is, for example a phenylalkyl radical, such as a 1- or 2-phenyl-ethyl, 1-phenyl-propyl or phenylmethyl radical in which the aromatic nuclei may bear substituents, such as lower alkyl or free or substituted hydroxy, amino or mercapto groups, halogen atoms, trifluoromethyl or nitro groups, or, if desired, correspondingly substituted mononuclear heterocyclylalkyl radicals, such as pyridylmethyl, thenyl or furfuryl radicals. The alkyl radicals or the aralkyl or heterocyclyl-alkyl radicals may also be substituted, for example by one of the aforementioned aryl or heterocyclic radicals, for example as in the diphenylmethyl radical. Substituted hydroxy, mercapto or amino groups at the aryl radicals are, for example those mentioned for $R_1$, more especially lower alkoxy groups, such as methoxy, ethoxy, propoxy, butoxy, methylenedioxy, methylmercapto or dimethylamino groups; a halogen atom is particularly chlorine or bromine. In quaternary ammonium compounds there are additional substituents of the tertiary amino group, more especially lower alkyl radicals or aralkyl radicals, such as the aforementioned benzyl or phenylethyl radicals.

The new compounds have valuable pharmacological properties. More especially they have a coronary dilatating effect. The new compounds can consequently be used as medicaments, particularly for the treatment of circulatory disturbances of the myocardium, but also as intermediate products for the preparation of such medicaments.

Of special value are compounds of the formula

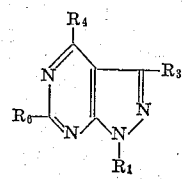

and, if desired, the salts thereof, in which $R_1$ represents lower alkyl, for example methyl, ethyl, propyl, isopropyl, butyl-(2), 3-methyl-butyl-(2), pentyl-(2), pentyl-(3), cycloalkyl, for example cyclopentyl or cyclohexyl, halogen-lower alkyl, such as choroethyl or oxa-lower alkyl, such as 3-oxa-pentyl and $R_3$ stands for hydrogen or lower alkyl and $R_6$ for an aralkyl radical, such as a phenylalkyl radical, more especially a phenylmethyl radical, in which the aryl radicals may be unsubstituted or mono-, di- or trisubstituted by halogen, such as chlorine or bromine, alkoxy, such as methoxy or ethoxy, alkyl, such as methyl, ethyl, propyl, isopropyl, butyl, tertiary butyl, methylenedioxy, trifluoromethyl, nitro or amino groups, and in which $R_4$ is a free mercaptic group or a mercapto group substituted, for example as defined above.

Furthermore there are of importance the compounds of the formula

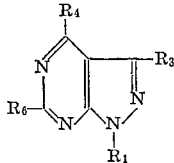

and, if desired, their salts, in which $R_1$, $R_3$ and $R_4$ have the meaning given above and $R_6$ represents an alkyl radical having more than 2 carbon atoms, for example propyl, isopropyl, butyl, isobutyl, amyl or isoamyl, and compounds of the formula

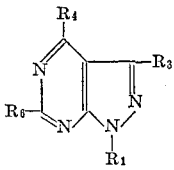

and, if desired, their salts, in which $R_3$ and $R_4$ have the meaning given above, $R_6$ represents methyl or ethyl and $R_1$ a cycloalkyl radical, such as cyclopentyl or cyclohexyl or more especially an alkyl radical having at least 3 carbon atoms, such as isopropyl, butyl-(2), pentyl-(2) or pentyl-(3), or an oxa-alkyl radical, such as 3-oxa-pentyl- or 5-oxa-heptyl-(2).

Of particular value are the compounds of the formula

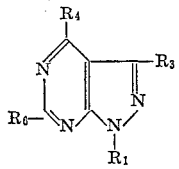

and their salts, in which $R_4$ has the meaning given above and $R_1$ represents a lower alkyl radical, $R_3$ a lower alkyl radical or more especially hydrogen and $R_6$ an unsubstituted benzyl radical or a benzyl radical mono-, di- or tri-substituted in the phenyl radical by chlorine, methoxy, methylenedioxy, methyl or trifluoromethyl.

In these different, preferred groups of compounds $R_4$ represents above all a free mercapto group or a lower alkyl-mercapto group, such as methyl-mercapto, ethyl-mercapto, propyl-mercapto or butylmercapto group.

The present invention relates more especially to the excellent coronary dilatator, 1-isopropyl-4-mercapto-6-benzylpyrazolo[3,4-d]pyrimidine of the formula

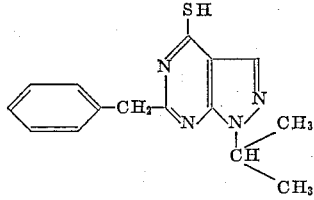

and also to the excellent coronary dilatator, 1-isopropyl-4-mercapto-6-methyl-pyrazolo[3,4-d]pyrimidine, and their salts.

The new compounds are obtained when in a 1-$R_1$-3-$R_3$-6-$R_6$-4-X-pyrazolo[3,4-d]pyrimidine, in which X represents a substituent convertible into the mercapto group $R_4$, and $R_1$, $R_3$, $R_4$ and $R_6$ have the meaning given above, X is converted into the mercapto group $R_4$ in the conventional manner.

The substituent X is more especially a reactive, esterified hydroxyl group, for example a halogen atom, such as chlorine, or a free hydroxyl group. The conversion is carried out in the conventional manner. The free hydroxyl group may be converted into a mercapto group by treatment with a sulfurating agent, such as phosphorus pentasulfide, or a halogen atom may be exchanged for a free mercapto group or an alkylmercapto or amino-alkylmercapto group, for example by treatment with thiourea, a metal salt of hydrogen sulfide or of an alkyl-mercaptan or aminoalkyl-mercaptan.

The 4-halogeno-pyrazolo[3,4-d]pyrimidines used as starting materials in the present process are obtained by treating a corresponding 4-hydroxy-compound with a halogenating agent, more especially a phosphorus halide, such as phosphorus oxychloride or phosphorus pentachloride. The 1-$R_1$-3-$R_3$-4-halogen-6-lower alkyl-pyrazolo[3,4-d]pyrimidines, wherein $R_1$ and $R_3$ have the first meaning given above and wherein, if $R_1$ stands for an alkyl radical, at least one of the alkyl radicals in 1- and 6-position contains more than 2 carbon atoms are new and have valuable properties. They are likewise included in the present invention.

In a resulting compound containing a free mercapto group or in their tautomers the tautomerizing hydrogen atom may be alkylated or aminoalkylated in the usual manner, for example with a reactive ester of an alcohol. Reactive esters suitable for this purpose are those of hydrochloric, hydrobromic or hydriodic acids, sulfuric acid or an aryl-sulfonic acid; suitable alcohols are more especially lower alkanols or aminoalkanols.

The above reactions are carried out in the conventional manner, preferably at a raised temperature, in the absence or presence of a diluent and/or condensing agent, under atmospheric or superatmospheric pressure.

The invention also includes any modification of the process in which an intermediate obtained at any stage of the process is used as starting material and the remaining steps are carried out, or the process is discontinued at any stage, or in which the starting materials are formed during the reaction, or a necessary substituent is introduced at any stage of the reaction. A resulting tertiary amine may be quaternated in the usual manner, for example with a reactive ester, for example one of those mentioned above, of an alkanol or a phenylalkanol.

Depending on the substituents present in the final products, various salts can be prepared therefrom. When they contain acidic mercapto groups, metal salts may be prepared, for example by dissolution in an alkali solution. Compounds of basic nature form salts with inorganic or organic acids. Suitable salt-forming acids are, for example, those which are therapeutically useful, such as hydrohalic acids, sulfuric acids, phosphoric acids, nitric acid, perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicylic, or para-aminosalicylic, methanesulfonic, ethanesulfonic, hydroxyethane-sulfonic, ethylene-sulfonic acid; toluene-sulfonic, naphthalenesulfonic acids or sulfanilic acid; methionine, tryptophan, lysine, arginine, cystein or glutamic acid. A resulting salt may be converted in the usual manner into its free base, or a free base into a salt thereof.

The new, pharmacologically valuable compounds, their salts or suitable mixtures thereof can be used, for example in the form of pharmaceutical preparations which contain the aforementioned compounds in admixture with an inorganic or organic excipient suitable for enternal, parenteral or local administration. Suitable excipients are substances that do not react with the above described compounds, for example gelatine, lactose, starches, magnesium stearate, talc, vegetable oils, water, benzyl alcohols, gums polyalkyleneglycols, cholesterol or any other known pharmaceutical excipient. The pharmaceutical preparations may be, for example, tablets or dragees, or in liquid form, solution, suspensions or emulsions. They may be sterilized and/or contain assistants, such as preservatives, stabilisers, wetting or emulsifying agents. They may also contain other therapeutically useful substances. The preparations are obtained by the usual methods. They contain 5–100 mg. of the active substance per dosage unit and about 1–70% of active substance.

The 4-hydroxy-compounds used for the manufacture of the 4-mercapto compounds have been described in our copending application Serial No. 107,906 filed May 5, 1961, or are obtained in an analogous manner, for example by condensing a 2-$R_1$-3-amino-5-$R_3$-pyrazole-4-carboxylic acid alkyl ester with a nitrile of the formula $R_6$—CN in the presence of sodium.

Starting materials preferably used in the present process are those which yield the final products described above as being particularly valuble. The starting materials may also be used in the form of their salts. They are obtained in a manner known per se.

The following examples illustrate the invention:

Example 1

A solution of 18.2 grams of 1-isopropyl-4-hydroxy-6-methyl-pyrazolo[3:4-d]pyrimidine in 200 cc. of pyridine is treated with 30 grams of phosphorus pentasulfide and the mixture is heated for 8 hours at the boil. The reaction solution is poured into 3 liters of ice water, kept overnight and the yellow precipitate is suctioned off on the following morning. Recrystallization from ethanol yields 1-isopropyl-4-mercapto-6-methyl-pyrazolo[3:4-d]pyrimidine of the formula

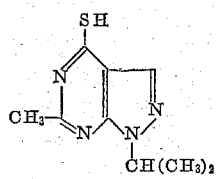

in crystals melting at 226–228° C.

The starting material is prepared in the following manner:

A solution of 9.9 grams of 2-isopropyl-3-amino-4-carbethoxy-pyrazole in 50 cc. of acetonitrile is treated with 2.4 grams of sodium while cooling with ice. During the reaction the temperature must not be allowed to rise above 30° C. On completion of the exothermic reaction the mixture is heated for 4 hours at 90–95° C. The reaction mixture is then cooled and treated with 100 cc. of ethanol and evaporated under vacuum. The residue is treated with 150 cc. of 2 N-sodium hydroxide solution and the excess acetonitrile is extracted with chloroform. The aqueous phase is adjusted with 5 N-hydrochloric acid to pH 3–4, whereupon after prolonged standing a solid precipitate is formed which is filtered off and recrystallized from ethanol, to yield 1-isopropyl-4-hydroxy-6-methyl-pyrazolo[3:4-d]pyrimidine of the formula

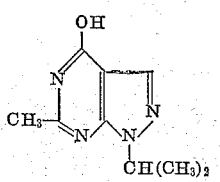

in white crystals melting at 195–196° C.

Example 2

A solution of 20.8 grams of 1-isopropyl-4-mercapto-6-methyl-pyrazolo[3:4-d]pyrimidine in 130 cc. of 2 N-sodium hydroxide solution is treated with 24 cc. of dimethyl sulfate, stirred for one hour at room temperature and kept overnight. The precipitate is suctioned off and crystallized from petroleum ether, to yield 1-isopropyl-4-methyl-mercapto-6-methyl-pyrazolo[3:4-d]pyrimidine in yellowish crystals melting at 66–67 °C.

Example 3

A solution of 13 grams of 1-isopropyl-4-hydroxy-6-benzyl-pyrazolo[3:4-d]pyrimidine in 100 cc. of pyridine is treated with 15 grams of phosphorous pentasulfide and the whole is heated at the boil for 8 hours. The reaction solution is then poured into 2 liters of ice water, kept overnight and the yellow precipitate is suctioned off. Recrystallization from a small amount of ethanol yields 1-isopropyl-4-mercapto-6-benzyl-pyrazolo[3:4-d]pyrimidine of the formula

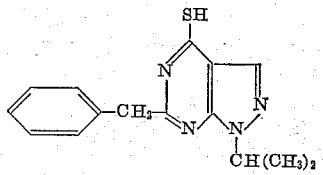

in yellow crystals melting at 145–147° C.

The starting material is prepared in the following manner:

2.3 grams of sodium are finely dispersed in 50 cc. of benzyl cyanide and 9.9 grams of 2-isopropyl-3-amino-4-carbethoxy-pyrazole are added. The mixture is heated with stirring for 4 hours at 110–112° C., allowed to cool, treated with 100 cc. of alcohol and evaporated under vacuum. The residue is taken up in 150 cc. of 2 N-sodium hydroxide solution, and the alkaline solution is extracted with chloroform to remove the undissolved material and then adjusted with 6 N-hydrochloric acid to pH 5–6; a solid product precipitates which is recrystallized from a small amount of alcohol, to yield 1-isopropyl-4-hydroxy-6-benzyl-pyrazolo[3:4-d]pyrimidine of the formula

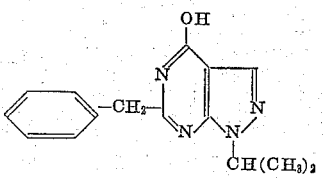

in colorless crystals melting at 165–166° C.

Example 4

7 grams of 1-isopropyl-4-mercapto-6-benzyl-pyrazolo[3:4-d]pyrimidine are added to a sodium ethylate solution prepared from 0.6 gram of sodium and 150 cc. of anhydrous ethanol. To form the sodium salt the mixture is stirred for one hour at room temperature, then treated with 3.5 grams of 2-chlorethyl-diethylamine, heated for 4 hours at the boil and evaporated to dryness in vacuum; the residue is dissolved in 100 cc. of N-hydrochloric acid, adjusted with sodium hydroxide solution to pH 10 and the precipitated oil is taken up in ether. The ether residue is mixed with alcoholic hydrochloric acid which is then evaporated and the residue is recrystallized from ethyl acetate, to yield the hydrochloride of 1-isopropyl-4-(β-diethylaminoethyl mercapto)-6-benzyl-pyrazolo[3:4-d]pyrimidine in crystals melting at 160° C.

Example 5

A solution of 14 grams of 1-isopropyl-4-mercapto-6-benzyl-pyrazolo[3:4-d]pyrimidine in 60 cc. of 2 N-sodium hydroxide solution is treated with 13 grams of dimethyl sulfate and stirred for 2 hours at room temperature. The alkaline solution is then extracted with ether and the ether residue is recrystallized from petroleum ether, to yield 1-isopropyl-4-methylmercapto-6-benzyl-pyrazolo[3:4-d]pyrimidine in crystals melting at 84–85° C.

Example 6

A solution of 11 grams of 1:6-diisopropyl-4-hydroxy-pyrazolo[3:4-d]pyrimidine in 100 cc. of pyridine is treated with 15 grams of phosphorus pentasulfide and the mixture is heated at the boil for 8 hours. The reaction solution is then poured into 2 liters of ice water, kept overnight and the yellow precipitate is suctioned off. Recrystallization from isopropyl ether yields 1:6- diisopropyl-4-mercapto-pyrazolo[3:4-d]pyrimidine of the formula

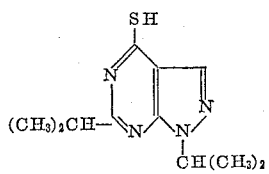

in yellow crystals melting at 170–171° C.

The starting material may be prepared in the following manner:

39.6 grams of 2-isopropyl-3-amino-4-carbethoxy-pyrazole and 9.2 grams of finely distributed sodium are added to 160 cc. of isobutyronitrile. The mixture is heated within one hour to 110° C. and stirred on at the same temperature for 4 hours, allowed to cool, treated with 15 cc. of ethanol and evaporated to dryness under vacuum; the residue is taken up in 100 cc. of 2 N-sodium hydroxide solution and the alkaline solution is extracted with chloroform. The aqueous phase is adjusted with 5 N-hydrochloric acid to pH 5–6, whereupon a solid product precipitates which is repeatedly recrystallized from ethanol, to yield 1:6-diisopropyl-4-hydroxy-pyrazolo-[3:4-d]pyrimidine in white crystals melting at 175–177° C.

*Example 7*

A solution of 23.6 grams of 1:6-diisopropyl-4-mercapto-pyrazolo[3:4-d]pyrimidine in 120 cc. of 2 N-sodium hydroxide solution is treated with 12.6 grams of dimethyl sulfate and stirred for 2 hours at room temperature. The alkaline solution is then extracted with ether and the residue is distilled. 1:6-diisopropyl-4-methyl-mercapto-pyrazolo[3:4-d]pyrimidine passes over between 106 and 109° C. under a pressure of 0.05 mm. Hg.

*Example 8*

11.8 grams of 1:6-diisopropyl-4-mercapto-pyrazolo-[3:4-d]pyrimidine is added to a sodium ethylate solution prepared from 1.15 grams of sodium and 400 cc. of ethanol. To form the sodium salt the mixture is stirred for one hour at room temperature, then treated with 7 grams of β-diethylamino-ethyl chloride, heated for 4 hours at the boil, and evaporated to dryness under vacuum. The residue is dissolved in 100 cc. of N-hydrochloric acid, the acid solution is extracted with ether, the hydrochloric solution is adjusted with sodium hydroxide solution to pH 10 and the precipitated oil is taken up in ether. The ether residue is distilled. 1:6-diisopropyl - 4 - (β-diethylaminoethylmercapto)-pyrazolo-[3:4-d]pyrimidine passes over at 138–140° C. under a pressure of 0.05 mm. Hg.

*Example 9*

11.8 grams of 1:6-diisopropyl-4-mercapto-pyrazolo-[3:4-d]pyrimidine are added to a sodium ethylate solution prepared from 1:15 grams of sodium and 400 cc. of ethanol. To form the sodium salt the mixture is stirred for one hour at room temperature, then treated with 7.8 grams of γ-diethylamino-propyl chloride, heated for 4 hours at the boil and evaporated to dryness under vacuum. The residue is dissolved in 100 cc. of N-hydrochloric acid, the acid solution is extracted with ether, the hydrochloric solution is adjusted with sodium hydroxide solution to pH 10 and the precipitated oil is taken up in ether. The ether residue is distilled. 1:6-diisopropyl-4 - (γ - diethylaminopropylmercapto) - pyrazolo[3:4-d] pyrimidine passes over at 149–151° C. under a pressure of 0.02 mm. Hg.

*Example 10*

11.8 grams of 1:6-diisopropyl-4-mercapto-pyrazolo [3:4-d]pyrimidine are added to a sodium ethylate solution prepared from 1.15 grams of sodium and 400 cc. of ethanol. To form the sodium salt the mixture is stirred for one hour at room temperature, then treated with 7.7 grams of β-piperidino-ethyl chloride, heated for 4 hours at the boil and evaporated to dryness under vacuum. The residue is dissolved in 100 cc. of N-hydrochloric acid, the acid solution is extracted with ether, the hydrochloric solution is adjusted with sodium hydroxide solution to pH 10 and the precipitated oil is taken up in ether. The ether residue is distilled. 1:6-diisopropyl-4-(β-piperidinoethylmercapto) - pyrazolo[3:4-d]pyrimidine passes over at 155–157° C. under a pressure of 0.02 mm. Hg. The hydrochloride prepared therefrom melts at 163–165° C.

*Example 11*

11.8 grams of 1:6-diisopropyl - 4 - mercapto-pyrazolo [3:4-d]pyrimidine are added to a sodium ethylate solution prepared from 1.15 grams of sodium and 400 cc. of ethanol. To form the sodium salt the mixture is stirred for one hour at room temperature, then treated with 5.7 grams of β-dimethylamino-ethyl chloride, heated for 4 hours at the boil and evaporated to dryness in vacuo. The residue is dissolved in 100 cc. of N-hydrochloric acid, the acid solution is extracted with ether, the hydrochloric solution is adjusted with sodium hydroxide solution to pH 10 and the precipitated oil is taken up in ether. The ether residue is distilled. 1:6-diisopropyl - 4 - (β-dimethyl-aminoethylmercapto)-pyrazolo [3:4-d]pyrimidine passes over at 129–130° C. under a pressure of 0.05 mm. Hg. The hydrochloride prepared therefrom melts at 178–180° C.

*Example 12*

1-isopropyl - 4 - mercapto - 6 - benzyl-pyrazolo-[3:4-d] pyrimidine is made up in the usual manner into tablets containing:

|  | Mg. |
|---|---|
| 1-isopropyl-4-mercapto-6-benzyl-pyrazolo-[3:4-d]pyrimidine | 10 |
| Lactose | 35 |
| Non-swellable starch | 20 |
| Wheat starch | 10 |
| Aerosil | 10 |
| Arrowroot | 12 |
| Magnesium stearate | 0.5 |
| Talc | 6 |

What is claimed is:

1. A member selected from the group consisting of a compound of the formula:

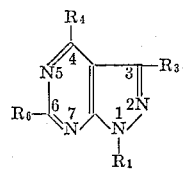

and their tautomers, in which $R_1$ represents a member selected from the group consisting of lower alkyl, halogen-lower alkyl, lower alkoxy-lower alkyl, cyclopentyl, cyclohexyl, cyclopentyl-lower alkyl, cyclohexyl-lower alkyl, $R_3$ stands for a member selected from the group consisting of hydrogen and lower alkyl, $R_4$ for a member selected from the group consisting of mercapto, lower alkylmercapto di-lower alkylamino-lower alkylmercapto, piperidino-lower alkylmercapto, pyrrolidino-lower alkylmercapto, morpholino-lower alkylmercapto and piperazino-lower alkylmercapto, and $R_6$ for a member selected from the group consisting of phenyl-lower alkyl, (lower alkyl-phenyl)-lower alkyl, (hydroxyl-phenyl)-lower alkyl, (lower alkoxy-phenyl)-lower alkyl, (mercapto-phenyl)-lower alkyl, (lower alkylmercapto-phenyl)-lower alkyl, (amino-phenyl)-lower alkyl, (lower alkylamino-phenyl)-lower alkyl, (di-lower alkylamino-phenyl)-lower alkyl, (halo-phenyl)-lower alkyl, (trifluoromethyl-phenyl)-lower alkyl, (nitrophenyl)-lower alkyl, their aryl lower alkyl quaternary ammonium compounds, their lower alkyl quaternary ammonium compounds, their therapeutically useful salts with metals and their therapeutically useful salts with acids.

2. A 1-lower alkyl-4-mercapto - 6 - benzyl-pyrazolo-[3,4-d]pyrimidine.

3. A 1-lower alkyl-4-lower alkylmercapto - 6 - benzyl-pyrazolo[3,4-d]pyrimidine.

4. A 1-lower alkyl-4-di-lower alkylamino-lower alkyl-mercapto-6-benzyl-pyrazolo[3,4-d]pyrimidine.

5. A 1-lower alkyl-4-piperidino-lower alkylmercapto-6-benzyl-pyrazolo[3,4-d]pyrimidine.

6. 1-isopropyl-4-mercapto - 6 - benzyl-pyrazolo[3,4-d]-pyrimidine.

7. Therapeutically useful salts of the compound defined in claim 6.

8. 1-isopropyl-4-methylmercapto - 6 - benzyl-pyrazolo-[3,4-d]pyrimidine.

References Cited in the file of this patent
UNITED STATES PATENTS
2,965,643    Druey et al. _____ Dec. 20, 1960
OTHER REFERENCES
Cheng et al.: J. Org. Chem., vol. 23, p. 191–200 (1958).